United States Patent [19]

Tebbe

[11] Patent Number: 4,696,968
[45] Date of Patent: Sep. 29, 1987

[54] MELT-FORMABLE ORGANOALUMINUM POLYMER

[75] Inventor: Frederick N. Tebbe, Hockessin, Del.

[73] Assignee: E. I. Du Pont de Nemours and Company, Wilmington, Del.

[21] Appl. No.: 903,448

[22] Filed: Sep. 4, 1986

[51] Int. Cl.$^4$ ............................................. C08G 79/10
[52] U.S. Cl. .................................... 524/610; 524/857; 525/389; 525/540; 528/9
[58] Field of Search ................... 528/9; 525/389, 540; 524/610, 857

[56] References Cited

U.S. PATENT DOCUMENTS

| | | | |
|---|---|---|---|
| 3,505,246 | 4/1970 | Ehrlich et al. | 528/9 |
| 3,651,112 | 3/1972 | Sinn et al. | 528/9 |
| 4,179,459 | 12/1979 | Dozzi et al. | 528/9 |

Primary Examiner—Harold D. Anderson
Attorney, Agent, or Firm—James A. Costello

[57] ABSTRACT

An organoaluminum polymer formed from $R_3Al$ and $R_2AlNH_2$ that is useful for forming shaped articles of inorganic aluminum nitride along or with other nitrides, oxides, carbides or combinations thereof; R being selected from $C_xH_{2x+1}$ wherein x is 1 to 10.

27 Claims, No Drawings

MELT-FORMABLE ORGANOALUMINUM POLYMER

BACKGROUND OF THE INVENTION

Conversion of $(CH_3)_3Al$ and $NH_3$ to aluminum nitride is known: Bähr, FIAT, Rev. Ger. Sci., Inorg. Chem. II, 155 to 179 (1948). The reaction is as follows:

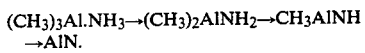

There is no teaching or suggestion that the $CH_3AlNH$ intermediate was isolated or that the final reaction step was conducted in the presence of ammonia.

Laubengayer et al., J. Amer. Chem. Soc., 83, pages 542 to 546 (1961), disclose the reactions of amines at low temperatures with aluminum alkyls or alkyl aluminum chlorides to form 1:1 addition compounds. When such addition compounds having N—H and Al—R bonding are pyrolyzed, intermolecular condensation occurs, alkanes are evolved and aluminum-nitrogen polymeric products are formed. By control of the conditions of pyrolysis, the condensation results in a sequence of reactions producing amide aluminum polymers, imide aluminum polymers and, finally, aluminum nitride.

Laubengayer et al., Inorg. Chem., 1, pages 632 to 637 (1962), disclose the reaction of triphenylaluminum and methylamine in toluene solution to form methylamido triphenylaluminum. This adduct loses benzene when heated in a vacuum and forms methylamine diphenylaluminum which in turn evolves benzene to form methyliminophenylaluminum. Triphenyl aluminum and dimethylamine react in toluene solution to form dimethylamine triphenylaluminum which is heated to form dimethylamido diphenylaluminum.

Cohen et al., J. Chem. Soc., pages 1092 to 1096 (1962), disclose that ethylaluminum dichloride and diethylaluminum chloride form complexes with ammonia. There is no ammonolysis of aluminumchlorine bonds. On heating, the complexes lose ethane and aluminum trichloride-ammonia, with the formation of aluminum-nitrogen polymers. They also disclose the reaction of $(C_2H_5)_3Al$ and $NH_3$, and conversion of the product to $C_2H_5AlNH$ which is described as polymeric and insoluble in organic solvents. Said polymer, however, is substantially infusible and therefore could not be converted to desirable morphologies by melt-forming techniques.

Interrante, in a meeting of the Materials Research Society, April, 1986, at Palo Alto, CA, disclosed the conversion of $C_2H_5AlNH$ to aluminum nitride in the presence of ammonia. The aluminum nitride produced with ammonia contained less carbon than that formed without it. Interrante also disclosed that $C_2H_5AlNH$ is converted to aluminum nitride at 300° C. to 900° C. with retention of morphology.

SUMMARY OF THE INVENTION

This invention concerns a polymer comprising the reaction product of $R_2AlNH_2$ and $R_3Al$, said polymer having a mole fraction derived from $R_3Al$ greater than zero and less than 1. Preferred mole fractions are about 0.002 to 0.500. Polymer formation is accomplished by heating the $R_2AlNH_2$ and $R_3Al$ moieties at elevated temperatures, typically in the range of 120° to 200° C. with a preferred range of 140° to 175° C.

The $R_3Al$ component of the disclosed polymer is synthesized by reaction of aluminum metal with a $C_2$ to $C_{10}$ olefin in the presence of hydrogen gas. The $R_2AlNH_2$ component is made by reacting $R_3Al$ with ammonia according to the procedure of Cohen et al., J. Chem. Soc., pages 1092 to 1096 (1962). In the polymer of this invention, R is the same or different in each of $R_2AlNH_2$ and $R_3Al$ and is selected from $C_xH_{2x+1}$ wherein x is 1 to 10.

This invention also concerns shaped articles and fibers formed from the polymer described above as well as composites containing said polymer. This invention also concerns shaped articles and fibers of aluminum nitride made from said polymer by the method described hereafter.

DETAILS OF THE INVENTION

The polymer of this invention is made by combining $R_3Al$ and $R_2AlNH_2$ (individually synthesized) in the proper molar ratio, and heating; or, by adding $NH_3$ to $R_3Al$ to generate in situ the desired molar ratio of $R_3Al$ and $R_2AlNH_2$, followed by heating.

The viscosity of the polymer varies with the reaction time and temperature as well as the quantity of $R_3Al$ supplied to the system. The polymer can be made as a viscous liquid, or a glassy solid which is converted at temperatures above about 40° C. to a viscous liquid. Fibers can be drawn from the melt and cooled to ambient temperatures with retention of fiber morphology. Alternatively, fibers can be drawn from solutions, prepared by (i) dissolving the polymer in common organic solvents such as methylene chloride, n-hexane, cyclohexane, toluene, and the like, and (ii) evaporating the solvent from the solution of polymer, with preservation of the fibrous morphology. Fibers are prepared by pulling with a glass rod dipped into the polymer or by use of conventional melt-spinning or solution spinning equipment.

Treatment of the polymer in whatever form or shape with ammonia, hydrazine or similar nitrogen-containing compound cures it so that it is no longer fusible. One typical method for curing the polymer is to treat it in a stream of gas containing about 10% to 99% ammonia in nitrogen, or pure $NH_3$, at a pressure of about 1 mm to 10 atmospheres and at a temperature of about 50° C. to 175° C. Heating the cured polymer at about 800° to 1000° C. in the presence of ammonia, hydrazine or the like will convert it to high purity aluminum nitride. The density of the aluminum nitride so produced can be increased by heating it to about 1800° C. Shaped articles such as films, tapes, composites and the like, as well as fibers, can be prepared, cured and converted to aluminum nitride by the procedure described above. The aluminum nitride prepared by the method of this invention is characterized by high density which, in a preferred embodiment, is substantially equivalent to the theoretical density of aluminum nitride.

Utility and Composite Formation

Composites including shaped composites are formed by adding an inorganic nitride, oxide, carbide or RAlNH to the polymer, forming the shaped article, curing the polymer and heating to form a shaped article of aluminum nitride or aluminum nitride containing a disparate inorganic nitride, an oxide, or a carbide component. Inorganic nitrides, oxides and carbides which can be used for preparation of the composites of this invention include $SiO_2$, $Si_3N_4$, SiC, TiC, ZrC, $B_2O_3$, BN, $Al_2O_3$, $TiO_2$, TiN, $Mg_2Al_4Si_5O_{18}$ and $ZrO_2$, in addition to AlN. The amount of oxide, nitride or carbide contained in the composite can be as high as about 85% or more.

An alternative method for forming composites comprises adding an inorganic oxide or RAlNH to the polymer, forming the shaped article, exposing the shaped article to moisture to convert the polymer to Al(OH)$_3$, and heating at about 800° to 1800° C. to form a shaped article of alumina or alumina containing other inorganic oxides.

Films are prepared by applying a thin coating of the polymer on a substrate such as silicon metal, curing the polymer and heating at about 800° to 1800° C. to form a film of aluminum nitride on a substrate. Tapes are prepared by adding the polymer to a die of appropriate thickness, curing, and heating at about 800° to 1800° C. to form tapes of aluminum nitride.

The polymer of this invention can be melt-shaped and converted to aluminum nitride of corresponding morphology by treatment in accordance with the foregoing description. They can be solubilized and shaped in accordance with liquid-handling techniques. The solvent can then be removed in any convenient manner and the polymer cured and converted to aluminum nitride.

The solutions can be spray-dried to produce polymer particles which can be cured and then heated to convert them to aluminum nitride of corresponding morphology. The polymer of this invention, in any of the nearly unlimited number of shapes in which it can be made, is combinable with other materials to form composites, reinforced materials, and the like, useful in ceramic and heat conduction applications.

The following Examples illustrate the invention. Procedures and reactions were conducted under an atmosphere of nitrogen or, where noted, ammonia or ammonia-nitrogen mixtures.

EXAMPLE 1

With the exclusion of air and moisture, triethylaluminum, 80 ml, in a 500 ml round-bottomed flask was stirred and treated with gaseous ammonia at 24° C. to 65° C. An excess of ammonia was supplied to insure that the reaction proceeded to completion. The reaction mixture consisted of (C$_2$H$_5$)$_2$AlNH$_2$ and ammonia. Excess ammonia was evaporated from the stirred mixture by warming it to 56° C. under a vacuum of about 0.1 torr. The product was (C$_2$H$_5$)$_2$AlNH$_2$.

A solution of the (C$_2$H$_5$)$_2$AlNH$_2$ (2.5 g, 25 mmol) and (C$_2$H$_5$)$_3$Al (0.35 g, 8.7 mmol) was heated at 164° C. for 3 to 5 minutes and then at 144° C. for 0.5 hours. The product, a polymeric reaction product of amidodiethylaluminum and triethylaluminum, was a viscous liquid at the synthesis temperature.

EXAMPLE 2

Preparation of Polymer Fibers

A portion of the viscous liquid product from Example 1 was heated to 165° C. and fibers spun from the melt. Upon cooling to ambient temperature the fibers were converted to a glassy solid with retention of the fiber morphology.

EXAMPLE 3

Preparation of AlN Fibers

The fibers from Example 2 were placed in a quartz tube and treated at ambient temperature overnight with a continuous flow of ammonia (10%) in nitrogen at atmospheric pressure. With continued flow of gas, the tube was heated. The temperature to which the tube was heated, the rate of increase of temperature, and the time at temperature was: 70° C., 1°/min, 1.5 hr; 125° C., 1°/min, 1.5 hr; 150° C., 1°/min, 1.5 hr; 200° C. 1°/min, 1 hr; 280° C., 0.5°/min, 1.5 hr; 300° C., 1°/min, 1.5 hr; 350° C., 1°/min, 1.5 hr; 900° C., 1°/min, 2 hr. The fibers so prepared were fine-grained ceramics with the X-ray powder pattern of aluminum nitride.

EXAMPLES 4 to 13

Preparation of Polymer (C$_2$H$_5$)$_2$AlNH$_2$ and (C$_2$H$_5$)$_3$Al were combined in the indicated ratio to form a solution which was heated as indicated in the following Table. In each experiment, the solution became more viscous with time, at the reaction temperatures. The solutions remained transparent for (C$_2$H$_5$)$_3$Al mole fractions of 0.474 to 0.009. Fibers were drawn from the solutions of Examples 5 through 13.

TABLE

| Example | Mole Fraction (C$_2$H$_5$)$_3$Al | Conditions |
|---|---|---|
| 4 | 0.474 | 162° to 168° C./60 min |
| 5 | 0.306 | 157° to 172° C./15 min |
| 6 | 0.231 | 161° to 171° C./15 min |
| 7 | 0.056 | 157° to 172° C./46 min |
| 8 | 0.049 | 158° to 167° C./57 min |
| 9 | 0.042 | 159° to 170° C./38 min |
| 10 | 0.029 | 168° to 170° C./25 min |
| 11 | 0.018 | 159° to 179° C./75 min |
| 12 | 0.009 | 150° to 179° C./59 min |
| 13 | 0.002 | 155° to 175° C./50 min |

EXAMPLES 14 to 22

Preparation of ALN Fibers

The polymers made by the procedure described for Examples 5 to 13 can be converted to AlN fibers according to the procedure described with respect to Example 3.

The embodiments in which an exclusive property or privilege is claimed are defined as follows:

1. A polymer comprising the reaction product of R$_2$AlNH and R$_3$Al having a mole fraction derived from R$_3$Al greater than zero and less than 1, wherein R is selected from C$_x$H$_{2x+1}$, wherein x is 1 to 10.

2. A polymer according to claim 1 wherein the mole fraction is 0.002 to 0.500.

3. A polymer according to claim 1 in the form of a viscous liquid.

4. A polymer according to claim 1 in the form of a glassy solid.

5. A polymer according to claim 2 in the form of a viscous liquid.

6. A polymer according to claim 2 in the form of a glassy solid.

7. A shaped article of the polymer according to claim 1.

8. A shaped article of aluminum nitride made from the shaped article of claim 7.

9. A shaped article according to claim 7 in the form of a fiber.

10. A shaped article according to claim 8 in the form of a fiber.

11. A composite of a polymer according to claim 1 and one or more of an inorganic oxide, carbide, or nitride.

12. A composite of AlN and one or more of an inorganic oxide, carbide or other nitride, made by curing and heating the composite of claim 11.

13. A composite according to claim 11 comprising one or more of $SiO_2$, $Si_3N_4$, SiC, TiC, ZrC, $B_2O_3$, BN, $Al_2O_3$, $TiO_2$, TiN, $ZrO_2$ or $MgAl_4Si_5O_{18}$.

14. A composite of AlN and one or more of $SiO_2$, $Si_3N_4$, SiC, $Al_4C_3$, TiC, ZrC, $B_2O_3$, BN, $Al_2O_3$, $TiO_2$, TiN, $ZrO_2$ or $MgAl_4Si_5O_{18}$ made by curing and heating the composite of claim 13.

15. A shaped article of a composite according to claim 11.

16. A shaped article of a composite according to claim 12.

17. A method for making a fiber of the polymer according to claim 1 comprising melt-forming a fiber from the polymer in a viscous liquid state.

18. A method for making a fiber of the polymer according to claim 1 comprising forming a fiber from a solution of the polymer.

19. A method for making a fiber of aluminum nitride comprising curing a fiber of the polymer according to claim 1, and heating.

20. A method for making a shaped article of aluminum nitride comprising curing a shaped article of the polymer according to claim 1, and heating.

21. A method for making a shaped article of an aluminum nitride-containing composite comprising shaping the composite, curing the shaped composite and heating the cured composite.

22. A spray-dried particle of a polymer according to claim 1.

23. A particle of aluminum nitride made by curing and heating a particle of claim 22.

24. A method for making a composite of $Al_2O_3$ comprising exposing the polymer of claim 1 to moisture to convert it to $Al(OH)_3$ and heating the $Al(OH)_3$ in the presence of at least one member of the group $SiO_2$, $B_2O_3$, $TiO_2$, $ZrO_2$ or $Mg_2Al_4Si_5O_{18}$.

25. A composite of $Al_2O_3$ prepared by the method of claim 24 and one or more of $SiO_2$, $B_2O_3$, $TiO_2$, $ZrO_2$ or $Mg_2Al_4Si_5O_{18}$.

26. A shaped article according to claim 8 having a density substantially equivalent to the theoretical density of aluminum nitride.

27. A fiber according to claim 10 having a density substantially equivalent to the theoretical density of aluminum nitride.

* * * * *